(12) United States Patent
Cafaro et al.

(10) Patent No.: US 12,110,825 B1
(45) Date of Patent: Oct. 8, 2024

(54) SYSTEMS AND METHOD FOR DETECTING AND RESPONDING TO ICING CONDITIONS IN GAS TURBINE ENGINES

(71) Applicant: General Electric Company, Schenectady, NY (US)

(72) Inventors: Stefan Cafaro, Chapel Hill, NC (US); Brendon Leeker, Cincinnati, OH (US); Kevin Graziano, Liberty Township, OH (US); Kum-Kang Huh, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/239,459

(22) Filed: Aug. 29, 2023

(51) Int. Cl.
*F02C 7/047* (2006.01)
*F02C 9/50* (2006.01)

(52) U.S. Cl.
CPC ............... *F02C 7/047* (2013.01); *F02C 9/50* (2013.01); *F05D 2220/323* (2013.01); *F05D 2270/053* (2013.01); *F05D 2270/09* (2013.01); *F05D 2270/335* (2013.01)

(58) Field of Classification Search
CPC .... F02C 7/047; F02C 9/32; F02C 9/26; F02C 9/28; B64D 15/00; B64D 15/16; B64D 15/20
See application file for complete search history.

(56) References Cited

U.S. PATENT DOCUMENTS

| | | |
|---|---|---|
| 4,159,625 A | 7/1979 | Kerr |
| 4,414,807 A | 11/1983 | Kerr |
| 6,128,959 A | 10/2000 | McGovern |
| 6,526,356 B1 | 2/2003 | Dimaggio |
| 7,409,878 B2 | 8/2008 | Von Beck |
| 8,942,882 B2 | 1/2015 | Swearingen |
| 9,064,357 B1 | 6/2015 | Mccormick |

(Continued)

FOREIGN PATENT DOCUMENTS

| | | |
|---|---|---|
| CN | 208053658 | 11/2018 |
| CN | 110595683 | 12/2019 |

(Continued)

OTHER PUBLICATIONS

USPTO; U.S. Appl. No. 18/515,936, filed Nov. 21, 2023, entitled "Propulsion System With a Control System to Determine Health Information".

*Primary Examiner* — Craig Kim
(74) *Attorney, Agent, or Firm* — Fitch, Even, Tabin & Flannery LLP (57) ABSTRACT

An engine controller may include a processor and a feedback interface electrically coupled to the processor and one or more electric machine motor generators deployed in an aircraft engine. A memory, electrically coupled to the processor, is configured to store reference data used to indicate a presence of an icing condition. The processor is configured to monitor a feedback signal received at the feedback interface from the one or more electric machine motor generators and identify whether the feedback signal indicates that the icing condition is currently present in the aircraft engine based on a correspondence between the feedback signal and the reference data. The processor is configured to initiate an icing condition mitigation action in response to identifying that the icing condition is present.

13 Claims, 5 Drawing Sheets

(56) References Cited

U.S. PATENT DOCUMENTS

| | | |
|---|---|---|
| 9,114,885 B2 | 8/2015 | Calandra |
| 9,239,011 B2 * | 1/2016 | Jones ................ F02C 7/275 |
| 9,754,429 B2 | 9/2017 | Lacaille |
| 10,320,314 B2 | 6/2019 | Fox |
| 10,337,935 B2 | 7/2019 | Geiger |
| 11,047,316 B2 * | 6/2021 | Raykowski ............ F02C 9/32 |
| 11,084,601 B2 | 8/2021 | Abe |
| 11,143,328 B2 | 10/2021 | Neuzil |
| 11,203,414 B2 | 12/2021 | Wulff |
| 2003/0126862 A1 * | 7/2003 | Peplow ................ F02C 9/28 |
| | | 60/773 |
| 2009/0294593 A1 * | 12/2009 | Jacquet-Francillon ... F02C 9/52 |
| | | 244/134 R |
| 2013/0019608 A1 * | 1/2013 | Jones ................ B64F 5/20 |
| | | 60/39.093 |
| 2016/0178464 A1 | 6/2016 | Burns |
| 2018/0010527 A1 * | 1/2018 | Rowe ................ B64D 33/02 |
| 2018/0045116 A1 * | 2/2018 | Schenk ................ F02C 3/04 |
| 2018/0230853 A1 * | 8/2018 | Jastrzembowski ....... F02C 9/28 |
| 2019/0127079 A1 * | 5/2019 | Ribeiro ................ B64C 13/16 |
| 2020/0032670 A1 * | 1/2020 | Morris ................ F02C 7/047 |
| 2020/0325830 A1 * | 10/2020 | Raykowski ............ F01D 25/02 |
| 2020/0391873 A1 * | 12/2020 | Beauchesne-Martel .................... |
| | | F01D 25/02 |
| 2021/0277826 A1 * | 9/2021 | Ivakitch ................ F01D 5/18 |
| 2022/0243608 A1 | 8/2022 | Krzywon |
| 2022/0403776 A1 | 12/2022 | Muldoon |
| 2023/0024239 A1 * | 1/2023 | Riverin ................ F02C 7/04 |
| 2023/0348081 A1 * | 11/2023 | Riediger ................ B64D 35/00 |

FOREIGN PATENT DOCUMENTS

| | | | |
|---|---|---|---|
| EP | 4227496 A1 * | 8/2023 | ............ B64D 27/24 |
| FR | 3127024 | 3/2023 | |
| FR | 3127025 | 3/2023 | |
| FR | 3127269 | 3/2023 | |
| FR | 3129375 | 5/2023 | |
| FR | 3129428 | 5/2023 | |
| FR | 3129432 | 5/2023 | |
| FR | 3129436 | 5/2023 | |
| FR | 3129690 | 6/2023 | |
| FR | 3129970 | 6/2023 | |
| FR | 3129972 | 6/2023 | |
| FR | 3130313 | 6/2023 | |
| FR | 3130323 | 6/2023 | |
| FR | 3130747 | 6/2023 | |
| FR | 3130874 | 6/2023 | |
| FR | 3130875 | 6/2023 | |
| FR | 3130877 | 6/2023 | |
| FR | 3130879 | 6/2023 | |
| FR | 3130894 | 6/2023 | |
| FR | 3130895 | 6/2023 | |
| FR | 3130896 | 6/2023 | |
| FR | 3130897 | 6/2023 | |
| FR | 3132279 | 8/2023 | |
| FR | 3132729 | 8/2023 | |
| FR | 3132743 | 8/2023 | |
| FR | 3133367 | 9/2023 | |
| FR | 3133368 | 9/2023 | |

\* cited by examiner

SYSTEMS AND METHOD FOR DETECTING AND RESPONDING TO ICING CONDITIONS IN GAS TURBINE ENGINES

TECHNICAL FIELD

These teachings relate generally to engines and more particularly to systems and methods for detecting and responding to icing conditions in gas turbine jet engines.

BACKGROUND

Gas turbine and similar jet type engines can experience icing-related conditions during operation. These icing conditions can include accretion of ice on the fan or other parts of the turbine engine and shedding of previously accreted ice. Such ice accretion and shedding events can affect operation of the turbine engine by increasing engine load, producing unstable load imbalances, by producing sudden unexpected changes in the engine load, and/or increasing a stall risk for the aircraft.

BRIEF DESCRIPTION OF DRAWINGS

Various needs are at least partially met through provision of the systems and methods for detecting and responding to icing conditions in gas turbine engines described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Current engine control systems utilize dedicated sensors to identify the presence of icing conditions and typically employ electric or pneumatic anti-ice systems to melt accreting ice to restore engine performance and prevent uncontrolled shedding events. However, the additional sensors and/or de-icing systems employed by these systems can be expensive, experience performance degradation over time, add unnecessary complication to the engine, and deploy complicated control processes to protect hardware from stalls in the event of ice sheds and ice ingestion into the core. Additionally, aircrafts employing current engine de-icing systems can produce higher rotational speeds on a low-pressure spool relative to the maximum normal operating revolutions per minute (e.g., a higher N1 value) until the de-icing system is activated. These are all significant challenges in the context of aviation application settings.

Generally speaking, the various aspects of the present disclosure relate to an engine controller having a feedback interface electrically coupled to one or more electric machine motor generators deployed in an aircraft engine for use in providing icing protection to fan, mid-fan, and booster sections of an aircraft engine. In general, the engine controller described herein is configured to detect or identify the presence of an icing condition on the aircraft engine (e.g., an ice accretion event or ice shedding event) and employ various accommodation or mitigation processes in response to the detected icing condition. A signal received at the engine controller from the electric machine motor generators and/or other torque sensor deployed on the aircraft engine can be used to identify the presence of the icing condition. In some embodiments, high bandwidth portions of the feedback signal from the electric machine motor generators or other aspects of the hybrid electric architecture of the aircraft engine are used to recognize ice build-up on a surface that impacts a torsional signature of a shaft of the engine.

In some embodiments, the engine controller utilizes the electric machine motor generators to respond to the detection of the icing condition. In particular, the electric machine motor generators coupled to a low speed or a high speed shaft of the engine can transfer power from a low pressure or fan shaft to a high pressure or core shaft to provide increased operability headroom in advance of a future ice shedding event (e.g., to increase the N2 operability margin). The low speed shaft can include the low pressure shaft and the high speed shaft can include the high pressure shaft.

Additionally or alternatively, the engine controller can employ other methodologies to increase the operability headroom such as altering variable geometries of one or more engine components, triggering an air bleed of an engine compressor, or other similar methods known in the art.

Additionally, the engine controller can utilize the electric machine motor generators to initiate a de-icing sequence torque resonance mode. The torque resonance mode induces perturbations in the fan shaft of the engine to excite specific shaft modes that shake off ice accretions while simultaneously protecting core operability by injecting power into the core shaft. In some embodiments, the perturbations are induced by periodically varying power extraction operations from the fan shaft and core operability is simultaneously protected using steady state (e.g., non-periodic) N2 power injection.

Figure 1:
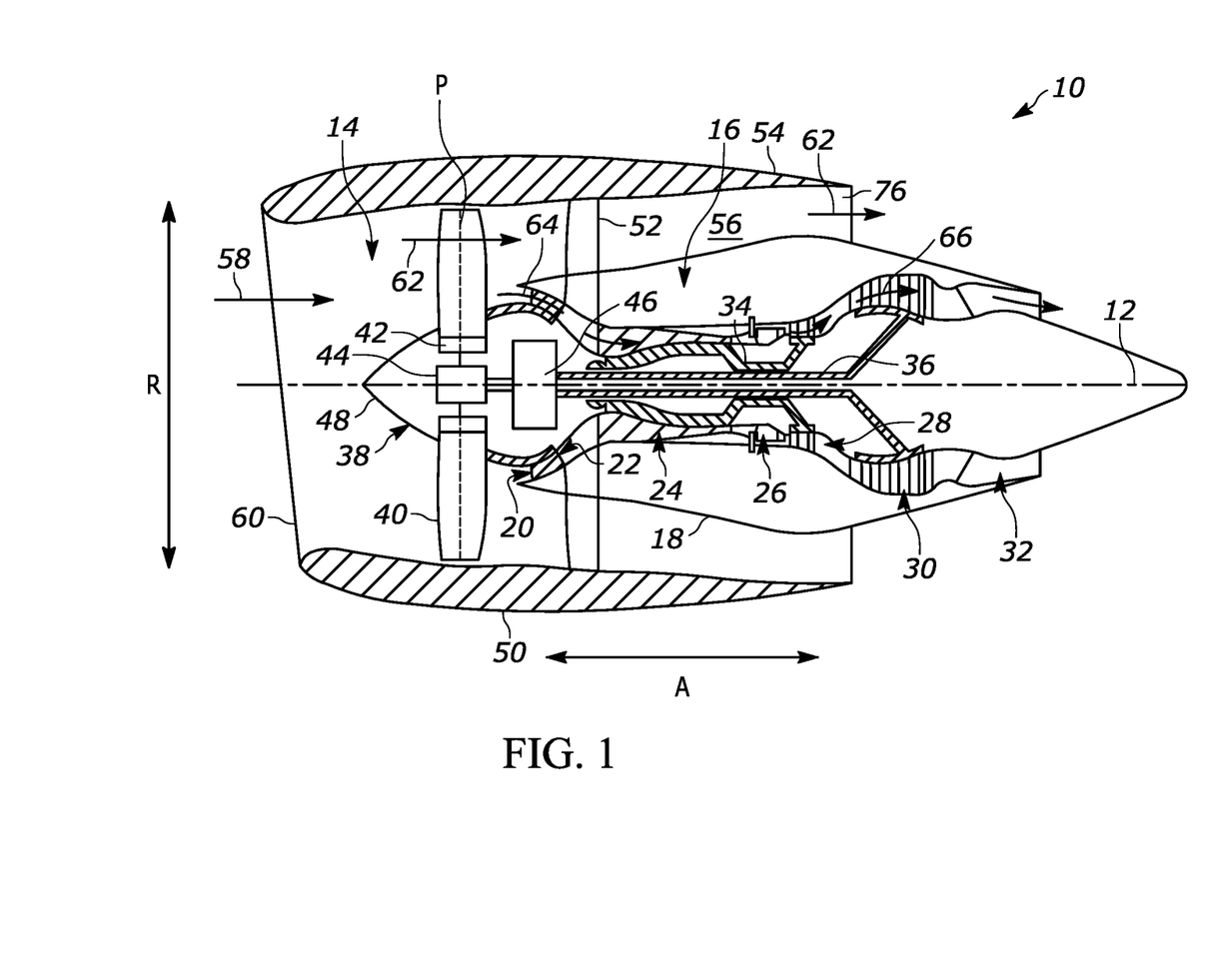
FIG. 1 is a cross-sectional view of a gas turbine engine for an aircraft.

Referring now to the drawings, wherein identical numerals indicate the same elements throughout the figures, FIG. 1 is a cross-sectional view of a gas turbine engine. The gas turbine engine is a high-bypass turbofan jet engine, referred to herein as "turbofan engine 10." The turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The core turbine engine 16 depicted in FIG. 1 includes a substantially tubular outer casing 18 that defines an annular inlet 20. The tubular outer casing 18 encases, in serial flow relationship, a compressor section including a low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) spool 36 drivingly connects the LP turbine 30 to the LP compressor 22.

The fan section 14 can include a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP spool 36 across a power gear box 46. The power gear box 46 includes a plurality of gears for stepping down the rotational speed of the LP spool 36 to a more efficient rotational fan speed. It will be appreciated that additional configurations for the fan section 14, such as those that employ a non-ducted or non-variable pitch design, are also contemplated.

Referring still to the embodiment of FIG. 1, the disk 42 is covered by rotatable front hub 48 aerodynamically contoured to promote an airflow through the plurality of fan blades 40. Additionally, the fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, the first portion 62 of the air 58 as indicated by the arrow is directed or routed into the bypass airflow passage 56 and a second portion 64 of the air 58 as indicated by the arrow is directed or routed into the LP compressor 22. The ratio between the first portion 62 of air 58 and the second portion 64 of air 58 is commonly known as a bypass ratio. The pressure of the second portion 64 of air 58 is then increased as it is routed through the HP compressor 24 and into the combustion section 26, where it is mixed with fuel and burned to provide combustion gases 66. Subsequently, the combustion gases 66 are routed through the hot flowpath, or hot-section flowpath, of the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan engine 10, also providing propulsive thrust.

It should be appreciated, however, that the turbofan engine 10 depicted in FIG. 1 is by way of example only, and that in other embodiments, aspects of the present disclosure may additionally, or alternatively, be applied to any other suitable gas turbine engine. For example, in other embodiments, the turbofan engine 10 may instead be any other suitable aeronautical gas turbine engine, such as a turbojet engine, turboshaft engine, turboprop engine, etc. Additionally, in still other embodiments, the turbofan engine 10 may include or be operably connected to any other suitable accessory systems. Additionally, or alternatively, the turbofan engine 10 may not include or be operably connected to one or more of the accessory systems discussed above.

Figure 2:
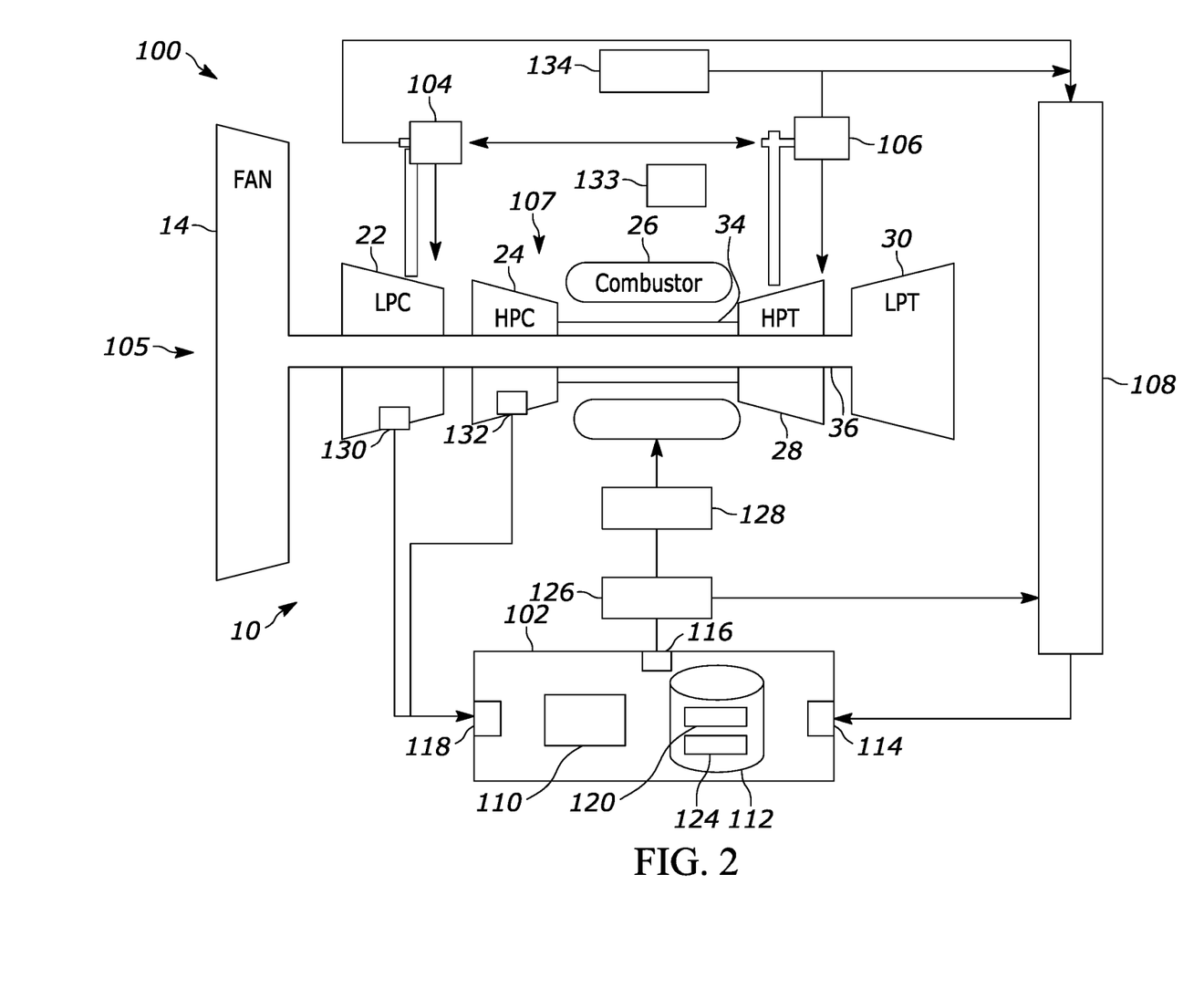
FIG. 2 is a schematic diagram of a gas turbine engine control system according to some embodiments.

Referring now to FIG. 2, a schematic diagram of a control system 100 for gas turbine engines such as the turbofan engine 10 of FIG. 1, according to some embodiments, is illustrated. The control system 100 includes an engine controller 102 such as a full authority digital engine controller (FADEC) or the like configured to control one or more electric machine motor generators (e.g., power converters) physically geared to portions of the turbofan engine 10. In particular, the one or more electric machine motor generators can include a low-pressure electric machine motor generator (LP-EM) 104 and a high-pressure electric machine motor generator (HP-EM) 106. The LP-EM 104 is geared to low-pressure components 105 of the turbofan engine 10, which include the LP compressor 22, the fan section 14, the LP spool 36, and the LP turbine 30. The HP-EM 106 is geared to high-pressure components 107 of the turbofan engine 10, which include the HP turbine 28, the HP compressor 24, and the HP spool 34. Both the LP-EM 104 and the HP-EM 106 are electrically coupled to the engine controller 102 via a data bus 108.

The engine controller 102 includes a processor 110, a memory 112, a feedback interface 114, a control interface 116, and a sensor interface 118. The processor 110 can include, for example, a microprocessor, a system-on-a-chip, an application-specific integrated circuit (ASIC), a field programmable gate array (FPGA), etc. The memory 112 can include, for example, an electrical charge-based storage media such as electrically erasable programmable read-only memory (EEPROM) or random access memory (RAM), or other non-transitory computer readable media such as an optical or magnetic based storage device. The memory 112 stores machine readable instructions 120 that are executable by the processor 110 to perform the various methods described herein and reference data 124 that is indicative of a presence of an icing condition such as an ice accretion event or an ice shedding event on the turbofan engine 10.

The feedback interface 114 is electrically coupled to the data bus 108 and is configured to receive a feedback signal 208 (see FIG. 4) from the LP-EM 104 and/or the HP-EM 106. The processor 110 monitors the feedback signal 208 received at the feedback interface 114 and identifies whether the feedback signal indicates that the icing condition is currently present in the turbofan engine 10 based on a correspondence between the feedback signal and the reference data 124. The feedback signal 208 serves as a proxy for monitoring high-frequency speed and/or torque oscillations in the low-pressure components 105 and/or high-pressure components 107. In particular, the processor 110 interprets a high-frequency portion of the feedback signal 208 into meaningful information regarding the presence of the icing condition (e.g., ice accretion and/or ice shedding event on or from specific surfaces of the turbofan engine 10).

In response to identifying that the icing condition is present, the processor 110 is configured to initiate an icing condition mitigation action. The icing condition mitigation action can assist in terminating the icing condition and/or decreasing a stall potential of the turbofan engine 10 that is generally increased by the presence of the icing condition. As described herein, the icing condition mitigation action can include a timed or coordinated power transfer into the high-pressure components 107 to improve core operability if an ice shedding event is detected or expected or if operating in the de-icing sequence torque resonance mode as described herein.

The control interface 116 is coupled to components 126 of the turbofan engine 10 that the processor 110 can direct to initiate the icing condition mitigation action. In particular, the processor 110 can control or modify an operating condition of the turbofan engine 10 to initiate the icing condition mitigation action. The sensor interface 118 can electrically connect the engine controller 102 to torque sensors 130 and 132, which are geared to the LP systems and HP systems of the turbofan engine 10, respectively. In some embodiments, the processor 110 can utilize status signals received at the sensor interface 118 from the torque sensors 130 and 132 to identify the presence of the icing condition either in conjunction with or in place of monitoring the feedback signal on the feedback interface 114. The torque sensors 130 and 132 can include surface acoustic wave (SAW) sensors or similar. In some embodiments, the feedback interface 114, the control interface 116, and the sensor interface 118 can be a part of a unified input and output or communication interface of the engine controller 102.

In some embodiments, the components 126 can include the LP-EM 104, the HP-EM 106, the combustion section 26, a fuel controller 128, and other components that affect the current operation of the turbofan engine 10. The current operating condition can include a pitch of one or more fans such as the fan section 14, a speed of one or more cores or shafts such as the HP spool 34 and the LP spool 36, and/or an overall operating line of the turbofan engine 10, for example. As understood by those having ordinary skill in the art, the operating line of the turbofan engine 10 defines a desired pressure ratio for the turbofan engine 10 for specified steady state mass flows from the turbofan engine 10 (See e.g. FIG. 3).

The presence of the icing condition during the operation of the turbofan engine 10 can cause changes in the overall performance of the turbofan engine 10. To account for these changes, the processor 110 is configured to initiate the icing condition mitigation action by directing, via the control interface 116, the components 126 to alter the current operating condition of turbofan engine 10 in response to the processor 110 determining that the icing condition is present. For example, where the operating condition includes the pitch of the one or more fans of the fan section 14 and the speed of the HP spool 34 and the LP spool 36, the processor is configured to alter the pitch and speed to maintain a current intended thrust output of the aircraft (e.g. the thrust level set by pilot input to the engine controller 102) while the icing condition is present.

Figure 3:
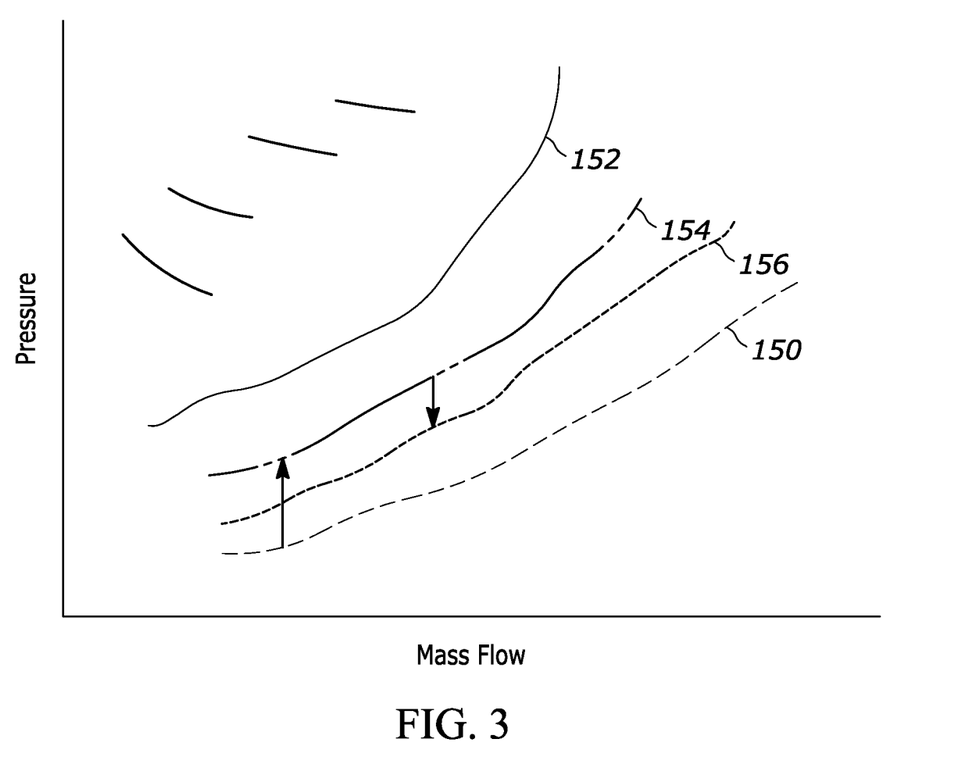
FIG. 3 is a graph a turbine engine operating lines under various conditions described herein.

Additionally, or alternatively, the processor 110 can be configured to direct other components of the turbofan engine 10 to lower the operating line of the turbofan engine 10 in response to detection of the icing condition. These additional components can include bleed valves, variable geometry rotors, variable geometry stators, and/or similar structures known in the art for use in lowering a turbo fan engine operating line. Generally as seen in FIG. 3, a normal or nominal position 150 of the operating line of the turbofan engine 10 is set at a specific offset distance from a stall line 152 of the turbofan engine 10 in order to maximize efficiency of the turbofan engine 10. Specifically, in some embodiments, the normal or nominal position 150 can be set to be in a range from about 10% to about 40% lower than the stall line 152. However, the presence of the icing condition causes changes in the performance of the turbofan engine 10 that move the operating line from the normal or nominal position 150 to a higher position 154 closer to the stall line 152, which may increase the risk of stall condition by eating away at the offset from the stall line 152 and increasing uncertainty about the location of the operating line relative to the stall line 152. In some embodiments, the higher position 154 can be in a range of about 10% to about 20% higher than the normal or nominal position 150. In response to the increase, the processor 110 lowers the higher operating line from the 154 down to a lower position 156 further away from the stall line 152 as compared with the higher position 154 to counteract the increased stall risk brought about by the presence of the icing condition. Although shown in FIG. 3 as being above the normal or nominal position 150 for the operating line, the lower position 156 can include various positions below the higher position 154 including the normal or nominal position 150. In some embodiments, the lower position 156 can be set to gain an additional stall margin of at least 10% when compared with the higher position 154 for the operating line that results from the presence of the icing condition.

Furthermore, the processor 110 is configured to mitigate some effects from the icing condition on performance of the turbofan engine 10 using the electric machine motor generators such as the LP EM 104 and/or the HP EM 106. In particular, the processor 110 is configured to direct, via the control interface 116, the one or more electric machine motor generators to transfer power from a first shaft of the turbofan engine 10 to a second shaft of the turbofan engine 10 in response to the processor 110 determining that the icing condition is present. This power transfer can set up a more conservative operating state for the turbofan engine 10 to anticipate ice sheds, improve thrust response, and prevent stalling (e.g. the power transfer lowers the operating line of the turbofan engine 10 to produce more overhead).

The power transfer between the first shaft and the second shaft is accomplished by the processor 110 directing at least one electric machine motor generator geared to the first shaft to apply a negative torque to the first shaft. This negative torque applied by the electric machine motor generator slows down the first shaft while converting rotational energy in the first shaft into electrical energy. This electrical energy is then transferred by the electric machine motor generator, via an electrical connection, to at least one electric machine motor generator geared to the second shaft. Upon receiving the electrical energy, the electric machine motor generator geared to the second shaft converts the electrical energy into a positive torque applied to the second shaft. The applied positive torque increases the rotational energy in the second shaft. In some embodiments, the electrical power used to apply the positive torque to the second shaft can be supplied in whole or in part from a power source or power storage device 133 (see FIG. 2) such as a battery instead of or in addition to being supplied from the electric machine motor generator geared to the first shaft. Various methods for directing the operation of the electric machine motor generators with the processor 110 are possible. Such methods include the processor 110 modulating a voltage or current value applied to a control input of the electric machine motor generator being directed and/or modulating a voltage or current value applied to a bus interconnected with the control input.

When the icing condition corresponds to the ice accretion event, the first shaft includes the fan shaft of the turbofan engine 10 (e.g. the LP spool 36 of FIG. 1) and the second shaft includes a core shaft of the turbofan engine 10 (e.g. the HP spool 34 of FIG. 1). Conversely, when the icing condition corresponds to the ice shedding event, the first shaft includes the core shaft and the second shaft includes the fan shaft. This power transfer from the core shaft to the fan shaft can be initiated after the stall concern from the prior ice accretion event is fully dissipated. In particular, the core shaft to fan shaft power transfer can be initiated in response to detecting a beginning of a core speed overshoot, in a gradually increasing manner, and/or following a time delay from detection of the ace shedding event. Furthermore, in some embodiments, when the icing condition corresponds to the ice shedding event, some or all of the power transferred from the core shaft can be applied to a power outlet device 134 (see FIG. 1) instead of or in addition to being applied to the fan shaft. The power outlet device 134 can include a resistance device that converts the transferred electrical energy into heat, an anti-ice system of the aircraft, other similar devices, and/or combinations thereof.

Figure 4:
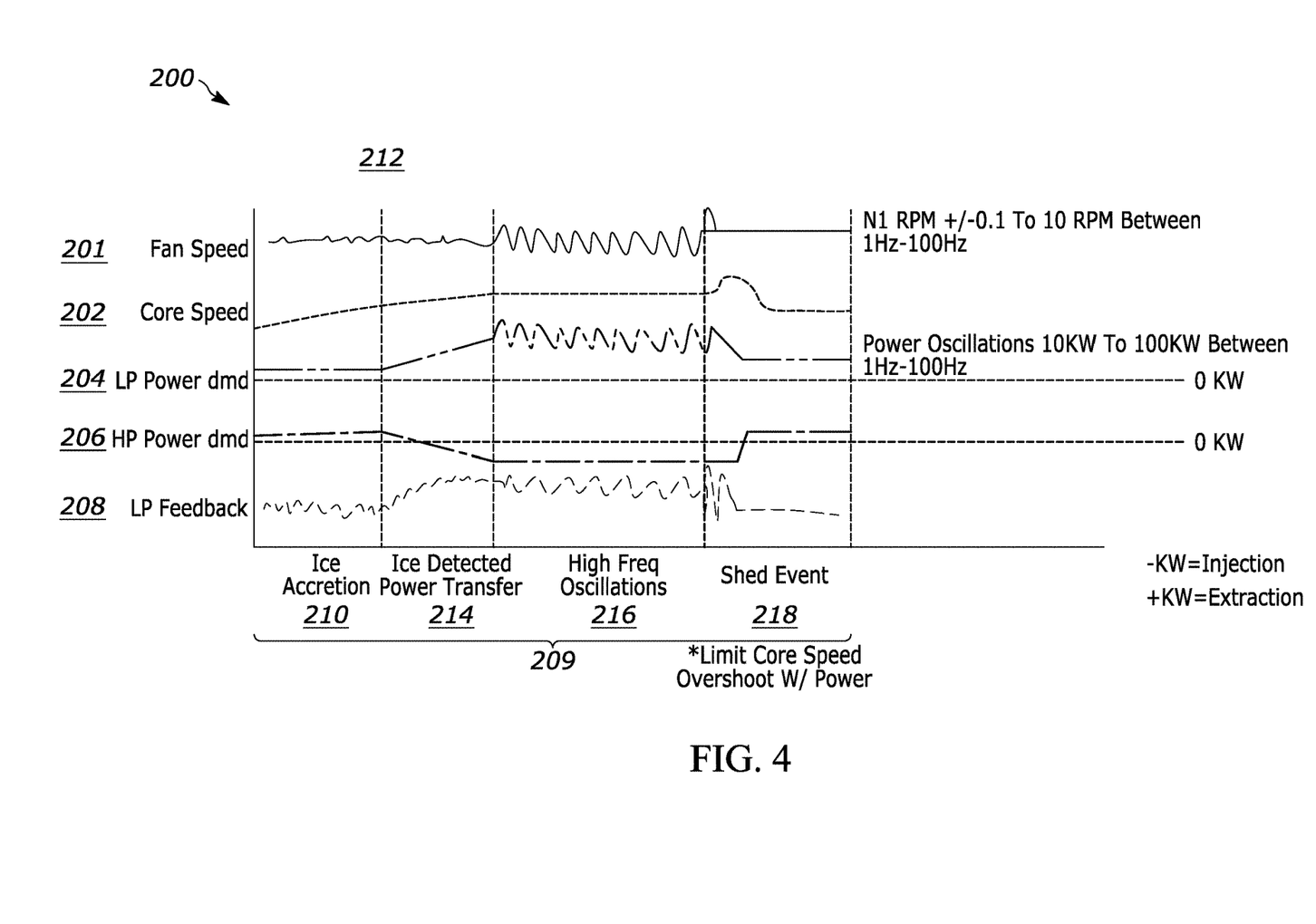
FIG. 4 is a graph of gas turbine engine parameters over time in response to the presence of icing conditions.

The power transfers between the fan shaft and core shaft initiated by the processor 110 in response to the icing conditions are shown in the graph 200 of FIG. 4. In particular, the graph 200 shows a fan speed 201 for the fan section 14 and the LP spool 36, a core speed 202 for the HP spool 34, a low power demand 204 for the low-pressure components 105 (FIG. 2), a high power demand 206 for the high-pressure components 107 (FIG. 2), and the feedback signal 208 received at the feedback interface 114 over a time period 209. The time period 209 shown in the graph 200 begins with an ice accretion period 210 where ice begins to build up on the fan section 14 or other areas of the turbofan engine 10. The processor 110, using the feedback signal 208 and/or readings from the torque sensors 130, 132, determines that the icing condition is present and corresponds to the ice accretion event at a detection time 212.

Following the first detection time 212, the processor 110 initiates the transfer of power from the fan shaft to the core shaft over a power transfer period 214. The power transfer mitigates negative effects of the ice accretion and prepares the engine for a possible ice shedding event. In particular, the power transfer can counteract speed mismatching during acceleration caused by flow blockage. The power transfer is shown in the graph 200 in the respective ramp up and ramp down of the low power demand 204 and high power demand 206 over the power transfer period 214. Following the power transfer period 214, the turbofan engine 10 can enter a high frequency oscillation period 216 before an ice shedding event 218 occurs. In some embodiments, the high frequency oscillation period 216 includes the de-icing sequence torque resonance mode as described herein. Then, once the ice shedding event 218 occurs (either naturally, via the de-icing sequence torque resonance mode, and/or via other de-icing methods known in the art) and the stall risk from the ice accretion is resolved, the processor 110 initiates a power transfer away from the core shaft to prevent or limit a core speed overshoot (e.g., an N2 overshoot) from occurring as a result of the shed mass of ice. As described herein, the power transfer can be from the core shaft to the fan shaft as shown in the graph 200 by the respective ramp down and ramp up of the low power demand 204 and high power demand 206. Therefore, the excess power in the core shaft that is causing the core speed overshoot is extracted and can be dumped into the fan shaft or the power outlet device 134 as described herein.

In some embodiments, the processor 110 is configured to respond to the detection of the ice accretion event, at the detection time 212, by activating the electric machine motor generators to enter the de-icing sequence torque resonance mode that injects perturbations or controlled vibrations into the fan shaft to excite specific shaft modes that reduce further ice accretion, shake off already present ice accretions, and/or trigger the ice shedding event 218. The controlled vibrations are specifically configured to trigger the ice shedding event 218 of the aircraft engine and, in some embodiments, have a frequency in the range of about 10 hz to about 100 hz. Utilizing the electric machine motor generators in this fashion can have minimal to no impact on engine thrust output and be transparent to the aircraft pilot. Furthermore, the injection of the perturbation can be timed/coordinated with transferring power into the high-pressure components 107 to improve core operability if a shed was detected or expected. Additionally, such a process can allow for the removal of conventional de-icing components of the turbofan engine 10. In some embodiments, engine effectors can be utilized to induce similar perturbations in the core shaft of the engine.

As discussed above, the feedback signal 208 is monitored by the processor 110 to determine the presence of the icing condition (e.g., to detect the ice accretion at the detection time 212 and to detect the ice shedding event 218). In particular, the feedback signal 208 shown in FIG. 4 includes high frequency portions (e.g. from about 10 Hz to about 500 Hz or, in some embodiments, to about 5,000 Hz) that the processor 110 utilizes in conjunction with the reference data 124 (see FIG. 2) to identify the presence of the icing condition. In particular, oscillations that the icing condition induces on the fan shaft of the turbofan engine 10 (e.g. the LP spool 36 of FIG. 1) correspond to resulting oscillations in the electrical signals output by the LP-EM 104 that are typically within the high frequency portion of the electrical signal (e.g. from above about 10 Hz as described above). In some embodiments, the feedback signal 208 can be from the LP-EM 104 (see FIG. 2), but embodiments using multiple feedback signals from both the LP-EM 104, the HP-EM 106, and/or other electric machine motor generators of the turbofan engine 10 are also possible. Furthermore, the feedback signal 208 can include an electrical current output from the LP-EM 104 and/or the HP-EM 106 as a proxy signal for torque on the low-pressure components 105 and the high-pressure components 107.

The reference data 124 can include a first dataset indicative of the ice accretion event and a second dataset different in whole or in part from the first dataset that is indicative of the ice shedding event 218. In some embodiments, the first dataset includes a first baseline. The first baseline can include a set of values or ranges of values for the feedback signal 208 under normal operating conditions for the turbofan engine 10 (e.g., where the icing condition is not present). In these embodiments, the processor 110 identifies the ice accretion event as the present icing condition when the processor 110 identifies fluctuations of the feedback signal 208 in a sampled series of the high frequency portions of feedback signal 208. Specifically, the ice accretion event is identified as present when the fluctuations increase in magnitude and/or frequency relative to the first baseline. The first baseline can also include ranges or individual expected values for the high frequency portions of the feedback signal as a function of a target operating condition of the aircraft engine such as the thrust input received from the pilot.

In some embodiments, the second dataset includes a second baseline, a time threshold, and a magnitude threshold. In these embodiments, the icing condition the processor 110 identifies as present is the ice shedding event 218 when the processor 110 identifies a value of the high frequency portions of the feedback signal in the sampled series that departs from the second baseline by an amount greater than the magnitude threshold in a time frame less than the time threshold. In some embodiments, the second baseline includes a rolling average of the high frequency portions of the feedback signal 208 over time. However, in additional embodiments, the second baseline is a set of values or ranges of values such as set of values or ranges of values for the feedback signal 208 under normal operating conditions for the turbofan engine 10 (e.g., where the icing condition is not present).

In some embodiments, the first dataset and the second data set can include Fast Fourier Transform (FFT) or similar frequency spectrum analyses of historical or simulated values of the feedback signal 208 under normal operating conditions for the turbofan engine 10. In these embodiments, the processor 110 can compare the frequency spectrum analyses of the first dataset and the second data set to a FFT or similar frequency spectrum analyses of the feedback signal 208 during operation of the turbofan engine 10 and identify the icing condition (e.g., the ice accretion or shedding event) as present when spikes in magnitude occur at frequencies around 10-500 hz are detected. Specifically, such spikes in the frequency magnitude are measured relative to the frequency analysis documented in the first and second datasets and represent frequencies of the feedback signal 208 that do not align to frequencies expected for shaft modes under normal operation of the turbofan engine 10.

In some embodiments, the first and second data sets can include one or more signal patterns documenting prior measured or simulated values or series of values for the feedback signal 208 when the ice accretion and/or ice shedding events are present, respectively. In these embodiments, the processor 110 is configured to determine whether real-time or sampled values of the feedback signal 208 received at the feedback interface 114 are a pattern match with the one or more signal patterns of the first and second data sets in order to determine whether the icing condition is present. Specifically, in some embodiments, the first and second data sets can include FFT or similar frequency spectrum analyses of historical or simulated values of the feedback signal 208 when the ice accretion and/or ice shedding events are present, which the processor 110 can then compare with a FFT or similar frequency spectrum analyses of the feedback signal 208 during operation of the turbofan engine 10 to identify a possible match.

Figure 5:
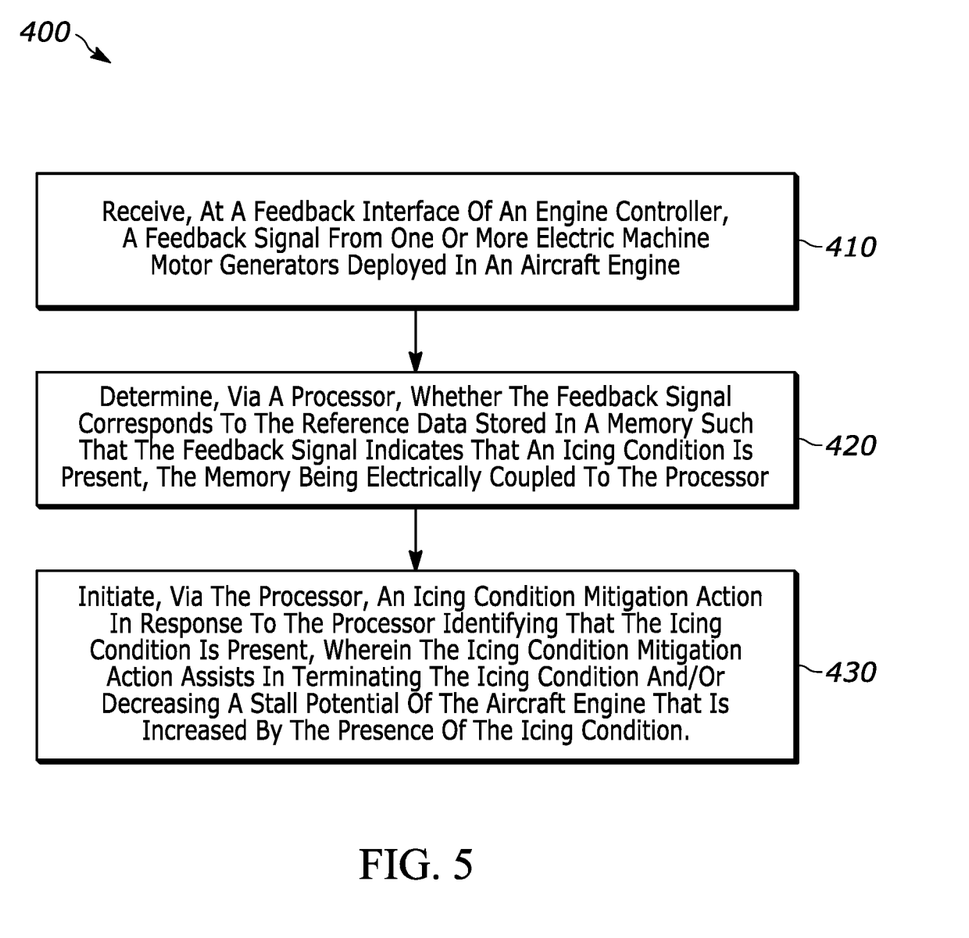
FIG. 5 is a flow diagram of a method for detecting and responding to an icing condition on an aircraft engine according to some embodiments.

Referring now to FIG. 5, a method 400 for detecting and responding to the icing condition on an aircraft engine such as the turbofan engine 10 of FIG. 1 is shown. The method 400 includes receiving, at the feedback interface 114, the feedback signal 208 from one or more electric machine motor generators, as in 410. Next, the method 400 includes determining, via the processor 110, whether the feedback signal 208 corresponds to the reference data 124 stored in the memory 112 such that the feedback signal 208 indicates that the icing condition is present, as in 420. Determining the correspondence between the feedback signal 208 and the reference data 124 can include any of the various methods described herein. For example, the processor 110 can utilize the first dataset indicative of the ice accretion event, the second dataset indicative of the ice shedding event, the first baseline, the second baseline, the time threshold, and/or the magnitude threshold to determine the correspondence.

After determining the correspondence, the method 400 includes initiating, via the processor 110, the icing condition mitigation action in response to the processor identifying that the icing condition is present, as in 430. As described herein, the icing condition mitigation action assists in terminating the icing condition and/or decreasing a stall potential of the turbofan engine 10 that is increased by the presence of the icing condition. Each of the various embodiments for the icing condition mitigation action can be initiated as part of the method 400. For example, the method 400 can include the processor 110 directing one or more of the components 126 to alter the current operating condition of the turbofan engine 10 when the processor 110 determines that the icing condition is present. As described herein, the one ore more components 126 can include the electric machine motor generators (e.g., the LP-EM 104 and/or the HP-EM 106) as well as other components useable to lower the operating line of the turbofan engine 10 to decrease the stall potential that is increased by the icing condition and/or to terminate or remove the icing condition by for example triggering an ice shedding event where the icing condition include the ice accretion event.

Further aspects of the disclosure are provided by the subject matter of the following clauses:

An engine controller comprising: a feedback interface electrically coupled to one or more electric machine motor generators deployed in an aircraft engine; and a processor electrically coupled to the feedback interface; and a memory electrically coupled to the processor, wherein the memory is configured to store reference data used to indicate a presence of an icing condition, wherein the processor is configured to monitor a feedback signal received at the feedback interface from the one or more electric machine motor generators and identify whether the feedback signal indicates that the icing condition is currently present in the aircraft engine based on a correspondence between the feedback signal and the reference data, and wherein the processor is configured to initiate an icing condition mitigation action in response to identifying that the icing condition is present, wherein the icing condition mitigation action assists in terminating the icing condition and/or decreasing a stall potential of the aircraft engine that is increased by the presence of the icing condition.

The engine controller of any preceding clause wherein the reference data includes i) a first dataset indicative of an ice accretion event of the aircraft engine and ii) a second dataset different from the first dataset and indicative of an ice shedding event of the aircraft engine.

The engine controller of any preceding clause wherein the first dataset includes a first baseline, wherein the icing condition the processor identifies as present comprises the ice accretion event when the processor identifies fluctuations of the feedback signal in a sampled series of the feedback signal that increase in magnitude and/or frequency relative to the first baseline, wherein the second dataset includes a second baseline, a time threshold, and a magnitude threshold, and wherein the icing condition the processor identifies as present comprises the ice shedding event when the processor identifies a value of the of the feedback signal in the sampled series that departs from the second baseline by an amount greater than the magnitude threshold in a time frame less than the time threshold.

The engine controller of any preceding clause wherein the first baseline includes a first range of expected values for the feedback signal as a function of a target operating condition of the aircraft engine, and wherein the second baseline includes a rolling average of the feedback signal over time.

The engine controller of any preceding clause further comprising a control interface electrically coupled to the processor and configured to electrically couple to one or more components of the aircraft engine, wherein the processor is configured to initiate the icing condition mitigation action by directing, via the control interface, the one or more components to alter a current operating condition of the aircraft engine in response to the processor determining that the icing condition is present.

The engine controller of any preceding clause wherein the current operating condition includes a pitch of one or more fans and a speed of one or more cores of the aircraft engine that the processor is configured to alter while maintaining a current thrust output of the aircraft in response to the processor determining that the icing condition is present.

The engine controller of any preceding clause wherein the one or more components include additional engine components that are configurable to lower an operating line of the aircraft engine at the direction of the processor in response to the processor determining that the icing condition is present.

The engine controller of any preceding clause wherein the one or more components include the one or more electric machine motor generators, and wherein the processor is configured to initiate the icing condition mitigation action by directing, via the control interface, the one or more electric machine motor generators to transfer power from a first shaft of the aircraft engine to a second shaft of the aircraft engine in response to the processor determining that the icing condition is present.

The engine controller of any preceding clause wherein the first shaft comprises a fan shaft of the aircraft engine and the second shaft comprises a core shaft of the aircraft engine when the icing condition corresponds to an ice accretion event of the aircraft engine.

The engine controller of any preceding clause wherein the first shaft comprises a core shaft of the aircraft engine and the second shaft comprises a fan shaft of the aircraft engine when the icing condition corresponds to an ice shedding event of the aircraft engine.

The engine controller of any preceding clause wherein the one or more components include the one or more electric machine motor generators, and wherein the processor is configured to initiate the icing condition mitigation action by directing, via the control interface, the one or more electric machine motor generators to apply power from a power source to a core shaft of the aircraft engine in response to the processor determining that the icing condition is present and corresponds to an ice accretion event of the aircraft engine.

The engine controller of any preceding clause wherein the one or more components include the one or more electric machine motor generators, and wherein the processor is configured to initiate the icing condition mitigation action by directing, via the control interface, the one or more electric machine motor generators to transfer power from a core shaft of the aircraft engine to a power outlet device in response to the processor determining that the icing condition is present and corresponds to an ice shedding event of the aircraft engine.

The engine controller of any preceding clause wherein the one or more components include the one or more electric machine motor generators, and wherein the processor is configured to initiate the icing condition mitigation action by directing, via the control interface, the one or more electric machine motor generators to induce controlled vibrations on a shaft of the aircraft engine in response to the processor determining that the icing condition is present and corresponds to an ice accretion event of the aircraft engine, the controlled vibration being configured to trigger an ice shedding event of the aircraft engine.

An engine ice control system comprising: an engine controller; and one or more electric machine motor generators deployed in an aircraft engine and electrically connected to the engine controller; wherein the engine controller is configured to direct the one or more electric machine motor generators to induce controlled vibrations on a shaft of the aircraft engine in response to the engine controller determining that an icing condition is present and corresponds to an ice accretion event of the aircraft engine using a status signal received by the engine controller, the controlled vibrations being configured to trigger an ice shedding event of the aircraft engine.

The engine ice control system of any preceding clause wherein the shaft of the aircraft engine comprises a fan shaft of the aircraft engine.

The engine ice control system of any preceding clause wherein the status signal is received from a torque sensor deployed in the aircraft engine.

The engine ice control system of any preceding clause wherein the status signal is a feedback signal received from one or more electric machine motor generators.

A method for detecting and responding to an icing condition on an aircraft engine, the method comprising: receiving, at a feedback interface of an engine controller, a feedback signal from one or more electric machine motor generators deployed in an aircraft engine; determining, via a processor, whether the feedback signal corresponds to the reference data stored in a memory such that the feedback signal indicates that an icing condition is present, the memory being, electrically coupled to the processor; and initiating, via the processor, an icing condition mitigation action in response to the processor identifying that the icing condition is present, wherein the icing condition mitigation action assists in terminating the icing condition and/or decreasing a stall potential of the aircraft engine that is increased by the presence of the icing condition.

The method of any preceding clause wherein initiating the icing mitigation action includes the processor directing one or more components of the aircraft engine to lower an operating line of the aircraft engine.

The method of any preceding clause wherein the reference data includes a first dataset indicative of an ice accretion event of the aircraft engine and a second dataset different from the first dataset and indicative of an ice shedding event of the aircraft engine, wherein the first dataset includes a first baseline, wherein the icing condition the processor identifies as present comprises the ice accretion event when the processor identifies fluctuations of the feedback signal in a sampled series of the feedback signal that increase in magnitude and/or frequency relative to the first baseline, wherein the second dataset includes a second baseline, a time threshold, and a magnitude threshold, and wherein the icing condition the processor identifies as present comprises the ice shedding event when the processor identifies a value of the of the feedback signal in the sampled series that departs from the second baseline by an amount greater than the magnitude threshold in a time frame less than the time threshold.

The systems and methods of any preceding clause wherein nominal position of an operating line of the aircraft engine is located in a range from about 10% to about 40% lower than a stall line of the aircraft engine.

The systems and methods of any preceding clause wherein the presence of the icing condition raises the location of the operating line in a range of about 10% to about 20% higher than the nominal position.

The systems and methods of any preceding clause wherein the condition mitigation action lowers the location of the operating line in a range of about 10% as compared with the raised location resulting from the presence of the icing condition.

The systems and methods of any preceding clause wherein the reference data includes a frequency spectrum analysis of historical or simulated values of the feedback signal under normal operating conditions for the aircraft engine.

The systems and methods of any preceding clause wherein the reference data includes a frequency spectrum analysis of historical or simulated values of the feedback signal when the icing condition is present in the aircraft engine.

What is claimed is:

1. An engine controller comprising:
   a feedback interface electrically coupled to one or more electric machine motor generators deployed in an aircraft engine; and
   a processor electrically coupled to the feedback interface;
   a memory electrically coupled to the processor;
   wherein the memory is configured to store reference data indicative of a presence of an icing condition;
   wherein the processor is configured to monitor a feedback signal received at the feedback interface from the one or more electric machine motor generators and identify the icing condition as present based on a combination of the feedback signal and the reference data;
   wherein the reference data includes a first dataset indicative of an ice accretion event of the aircraft engine and a second dataset different from the first dataset and indicative of an ice shedding event of the aircraft engine; and
   wherein the first dataset includes a first baseline, wherein the icing condition the processor identifies as present comprises the ice accretion event when the processor identifies fluctuations of the feedback signal in a sampled series of the feedback signal that increase in magnitude and/or frequency relative to the first baseline, wherein the second dataset includes a second baseline, a time threshold, and a magnitude threshold, and wherein the icing condition the processor identifies as present comprises the ice shedding event when the processor identifies a value of the feedback signal in the sampled series that departs from the second baseline by an amount greater than the magnitude threshold in a time frame less than the time threshold.

2. The engine controller of claim 1 wherein the first baseline includes a first range of expected values for the feedback signal as a function of a currently desired operating condition of the aircraft engine, and wherein the second baseline includes a rolling average of the feedback signal over time.

3. An engine controller comprising:
   a feedback interface electrically coupled to one or more electric machine motor generators deployed in an aircraft engine;
   a processor electrically coupled to the feedback interface;
   a memory electrically coupled to the processor;
   wherein the memory is configured to store reference data indicative of a presence of an icing condition;
   wherein the processor is configured to monitor a feedback signal received at the feedback interface from the one or more electric machine motor generators and identify the icing condition as present based on a combination of the feedback signal and the reference data;
   wherein the engine controller further comprises a control interface electrically coupled to the processor and configured to electrically couple to one or more components of the aircraft engine, wherein the processor is configured to direct, via the control interface, the one or more components to alter a current operating condition of the aircraft engine in response to the processor determining that the icing condition is present; and
   wherein the current operating condition includes a pitch of one or more fans and a speed of one or more cores of the aircraft engine that the processor is configured to alter while maintaining a current thrust output of the aircraft in response to the processor determining that the icing condition is present.

4. An engine controller comprising:
   a feedback interface electrically coupled to one or more electric machine motor generators deployed in an aircraft engine;
   a processor electrically coupled to the feedback interface;
   a memory electrically coupled to the processor;
   wherein the memory is configured to store reference data indicative of a presence of an icing condition;
   wherein the processor is configured to monitor a feedback signal received at the feedback interface from the one or more electric machine motor generators and identify the icing condition as present based on a combination of the feedback signal and the reference data;
   wherein the engine controller further comprises a control interface electrically coupled to the processor and configured to electrically couple to one or more components of the aircraft engine, wherein the processor is configured to direct, via the control interface, the one or more components to alter a current operating condition of the aircraft engine in response to the processor determining that the icing condition is present; and wherein the one or more components include additional engine components that are configurable to lower an operating line of the aircraft engine at the direction of the processor in response to the processor determining that the icing condition is present.

5. An engine controller comprising:

a feedback interface electrically coupled to one or more electric machine motor generators deployed in an aircraft engine;

a processor electrically coupled to the feedback interface;

a memory electrically coupled to the processor;

wherein the memory is configured to store reference data indicative of a presence of an icing condition;

wherein the processor is configured to monitor a feedback signal received at the feedback interface from the one or more electric machine motor generators and identify the icing condition as present based on a combination of the feedback signal and the reference data;

wherein the engine controller further comprises a control interface electrically coupled to the processor and configured to electrically couple to one or more components of the aircraft engine, wherein the processor is configured to direct, via the control interface, the one or more components to alter a current operating condition of the aircraft engine in response to the processor determining that the icing condition is present; and wherein the one or more components include the one or more electric machine motor generators, and wherein the processor is configured to initiate the icing condition mitigation action by directing, via the control interface, the one or more electric machine motor generators to perform an operation, the operation being one of:

transfer power from a first shaft of the aircraft engine to a second shaft of the aircraft engine in response to the processor determining that the icing condition is present;

apply power from a power source to a core shaft of the aircraft engine in response to the processor determining that the icing condition is present and corresponds to an ice accretion event of the aircraft engine;

transfer power from a core shaft of the aircraft engine to a power outlet device in response to the processor determining that the icing condition is present and corresponds to an ice shedding event of the aircraft engine; or induce controlled vibrations on a shaft of the aircraft engine in response to the processor determining that the icing condition is present and corresponds to an ice accretion event of the aircraft engine, the controlled vibration being configured to trigger an ice shedding event of the aircraft engine.

6. The engine controller of claim 5 wherein the first shaft comprises a fan shaft of the aircraft engine and the second shaft comprises a core shaft of the aircraft engine when the icing condition corresponds to an ice accretion event of the aircraft engine.

7. The engine controller of claim 5 wherein the first shaft comprises a core shaft of the aircraft engine and the second shaft comprises a fan shaft of the aircraft engine when the icing condition corresponds to an ice shedding event of the aircraft engine.

8. An engine ice control system comprising:

an engine controller; and one or more electric machine motor generators deployed in an aircraft engine and electrically connected to the engine controller;

wherein the engine controller is configured to direct the one or more electric machine motor generators to induce controlled vibrations on a shaft of the aircraft engine in response to the engine controller determining that an icing condition is present and corresponds to an ice accretion event of the aircraft engine using a status signal received by the engine controller, the controlled vibrations being configured to trigger an ice shedding event of the aircraft engine.

9. The engine ice control system of claim 8 wherein the shaft of the aircraft engine comprises a fan shaft of the aircraft engine.

10. The engine control system of claim 8 wherein the status signal is received from a torque sensor deployed in the aircraft engine.

11. The engine control system of claim 8 wherein the status signal is a feedback signal received from one or more electric machine motor generators.

12. A method for detecting and responding to an icing condition on an aircraft engine, the method comprising:

receiving, at a feedback interface of an engine controller, a feedback signal from one or more electric machine motor generators deployed in an aircraft engine;

determining, via a processor, whether the feedback signal corresponds to reference data stored in a memory such that the feedback signal indicates that an icing condition is present, the memory being electrically coupled to the processor; and initiating, via the processor, an icing condition mitigation action in response to the processor identifying that the icing condition is present, wherein the icing condition mitigation action assists in terminating the icing condition and/or decreasing a stall potential of the aircraft engine that is increased by the presence of the icing condition;

wherein the reference data includes a first dataset indicative of an ice accretion event of the aircraft engine and a second dataset different from the first dataset and indicative of an ice shedding event of the aircraft engine, wherein the first dataset includes a first baseline, wherein the icing condition the processor identifies as present comprises the ice accretion event when the processor identifies fluctuations of the feedback signal in a sampled series of the feedback signal that increase in magnitude and/or frequency relative to the first baseline, wherein the second dataset includes a second baseline, a time threshold, and a magnitude threshold, and wherein the icing condition the processor identifies as present comprises the ice shedding event when the processor identifies a value of the of the feedback signal in the sampled series that departs from the second baseline by an amount greater than the magnitude threshold in a time frame less than the time threshold.

13. The method of claim 12 wherein initiating the icing mitigation action includes the processor directing one or more components of the aircraft engine to lower an operating line of the aircraft engine.

* * * * *

UNITED STATES PATENT AND TRADEMARK OFFICE
CERTIFICATE OF CORRECTION

PATENT NO. : 12,110,825 B1
APPLICATION NO. : 18/239459
DATED : October 8, 2024
INVENTOR(S) : Stefan Cafaro et al.

It is certified that error appears in the above-identified patent and that said Letters Patent is hereby corrected as shown below:

In the Claims

In Column 16, Claim 10, Line 17, delete "engine" and insert -- engine ice --, therefor.

In Column 16, Claim 11, Line 20, delete "engine" and insert -- engine ice --, therefor.

Signed and Sealed this
Thirty-first Day of December, 2024

Derrick Brent
*Acting Director of the United States Patent and Trademark Office*